United States Patent [19]

Hsu

[11] Patent Number: 5,754,647
[45] Date of Patent: May 19, 1998

[54] SOFTWARE PROTECTION APPARATUS AND THE METHOD OF PROTECTION UTILIZING READ-WRITE MEMORY MEANS HAVING INCONSISTENT INPUT AND OUTPUT DATA

[75] Inventor: Jerry Hsu, Tainan, Taiwan

[73] Assignee: United Microelectronics Corporation, Taiwan

[21] Appl. No.: 624,770

[22] Filed: Mar. 27, 1996

[51] Int. Cl.$^6$ .............................. H04L 9/00; H04B 3/20; G06F 12/14
[52] U.S. Cl. ..................... 380/4; 364/286.6; 395/479; 395/490
[58] Field of Search ............... 380/4, 5; 364/286.6; 395/479, 490

[56] References Cited

U.S. PATENT DOCUMENTS 4,525,599  6/1985  Curran et al. .
5,513,337  4/1996  Gillespie et al. .................. 395/479
5,535,275  7/1996  Sugisaki et al. ................... 380/10
5,574,787  11/1996  Ryan ..................................... 380/5

*Primary Examiner*—Stephen C. Buczinski
*Attorney, Agent, or Firm*—Rabin, Champagne, & Lynt, P.C.

[57] ABSTRACT

An apparatus and method for software protection utilizing a read-write memory device having output data that is inconsistent with the corresponding input data. An emulator detector monitors address inputs to the memory device and detects suspect addressing that indicates an unauthorized memory access is taking place. Upon detection of suspect addressing, the emulator detector switches the memory into a mode in which the memory generates erroneous data, either continuously or intermittently. In addition, the emulator detector can drive a system bus, such as an address bus, a data bus, or a control bus, to a high or low state, either continuously or intermittently, causing an erroneous data read or failure of the emulator system.

128 Claims, 16 Drawing Sheets

SOFTWARE PROTECTION APPARATUS AND THE METHOD OF PROTECTION UTILIZING READ-WRITE MEMORY MEANS HAVING INCONSISTENT INPUT AND OUTPUT DATA

BACKGROUND OF THE INVENTION

1. Field of the Invention

This invention relates in general to a software protection apparatus and a method for using the apparatus to protect software from being compromised. In particular, the invention relates to a software protection apparatus and a method of software protection utilizing a read-write memory device having output data that is inconsistent with corresponding input data. More particularly, the invention relates to a software protection apparatus and its method of use for protecting against the unauthorized copying and pirating of commercial software programs distributed unidirectionally via channels such as cable television systems, and satellite communication systems, as well as over telephone networks.

2. Description of Background Art

Techniques for protecting computer data from unauthorized access and/or copying have been the subject of research for some time. In particular, encrypting computer data such that it cannot be recognized by an unauthorized user is a common step in protecting the data before storage or transmission. For an authorized user to return such data to its original form, a corresponding decryption process must be applied to the encrypted data. The restored data may then be used in normal computer operations.

Computer data protection techniques of the type utilizing encryption/decryption methods are carried out, generally, through the execution of specific computer software. In particular, the computer data is processed by a specific computer microprocessor executing the software. Accordingly, such computer software may not be easily portable for use by other microprocessors. Further, such software protection methodology may easily be defeated. That is, when such a method is implemented solely through the execution of computer software, it is fairly easy for an unauthorized user to analyze the encrypted computer data to break the encryption scheme, enabling access to the original computer data.

Under normal circumstances, the data written to a conventional random access memory (RAM) device are always the same as the data read from the RAM. Accordingly, it would be beneficial to provide an improved RAM device that minimizes or eliminates one or more of the problems set forth above.

Referring to FIG. 1, a block diagram of the electronics of a typical TV game system is shown. This system comprises a game console 10 and a game software cartridge 30. The game console 10 executes the game program code that is stored in the software cartridge 30. The game console 10 comprises a central processing unit (CPU) 14, a graphics processor 12, an audio processor 16, a memory device 18, and a TV signal synthesizer 19. Further, address bus 20, data bus 22 and control bus 24 couple the game console 10 and the software cartridge 30 of the system and convey program information between these two components. The software cartridge 30 includes a memory device 32 for storing game software, and software protection circuitry 34 coupled to the buses 20, 22, 24.

Due to recent rapid advancements and developments in broadcasting technology, transmission of program information can be accomplished via various communication media, such as cable television systems, and satellite communication systems, as well as over telephone networks. A great deal of information traffic is currently conducted using such broadcasting distribution systems. A TV game system that is suitable for unidirectional software distribution via a broadcast medium may be used as an example for discussion. A block diagram showing a TV game system that receives a downloaded software program is shown in FIG. 2.

The depicted TV game console 10 of FIG. 2 is similar to those found in conventional TV game devices, in that a CPU 14, a graphics processor 12, an audio processor 16, a memory device 18, and a TV signal synthesizer 19 are included. The game software cartridge 30, on the other hand, includes a receiver/converter 50 that processes a broadcast signal which conveys program information. The broadcast signal is received from an external source over a suitable channel 26. The receiver/converter 50 stores the received program information in the memory device 32 and provides the information to the memory device 32 over the data bus 22 to the address provided on the address bus 20 under the control of signals on the control bus 24. Read-only memory devices may also be included in the software cartridge 30 for controlling the operation of downloading the game title.

FIG. 3 of the drawing shows a block diagram of another TV game system that receives a downloaded broadcast software program, with RAM for storing the received software and ROM for controlling the system operation, such as an Operating System (OS) or BIOS in Personal Computer (PC). The broadcast signals received on the channel 26 are similarly received by the receiver/converter 50 and transmitted to the memory device 32, albeit by a direct connection with the memory device 32 rather than via the address bus 20, data bus 22 and control bus 24 as in the case of the system of FIG. 2 described above.

Sophisticated software programs are fruits of human intelligence and the results of hard work that requires the devotion of a great amount of manpower and the use of expensive equipment. Such programs must therefore be protected from software pirates, who reap monetary benefit from these programs without expending development, time, effort, and money. Various software protection methods have been employed in an effort to prevent illegal copying. For an unauthorized infringer, an important first step in pirating a piece of software is retrieving a true copy of the software program stored in the memory device 32. State-of-the-art of pirating technology allows an infringer to dump the program contents stored in the memory device 32 of current design software cartridges simply by using a microprocessor emulator, and systems have been designed to defeat such copying.

For example, U.S. patent application Ser. No. 08/599,477 discloses a method for protecting a software program employing a monitoring circuitry to detect a predetermined program status, such as the status of a microprocessor emulator stepping through the process of dumping the program contained in the memory device. Whenever the monitoring circuitry detects that particular program status, it initiates interference measures against the program dumping attempt, misleading the microprocessor emulator dumping operation by providing false dump results.

The method of software protection disclosed in the above 08/599,477 application is effective for TV game systems that employ the software program cartridge 30 shown in FIG. 1. It is, however, rendered useless when applied to systems such as those shown in FIGS. 2 and 3, which make use of broadcast distribution conducted via cable TV networks and satellite communications networks. This method will not work in these cases because there is necessarily a program code download operation during which time period the code stored into the memory of the receiving system is consistent with that to be retrieved for execution. Therefore, if the microprocessor emulator of the infringing party intercepts a complete sequence of program code during program code download transmission, the software program can be accurately copied and easily pirated.

SUMMARY OF THE INVENTION

The software program protection apparatus and method of the invention are suitable for protecting software programs that are distributed in unidirectional channels such as cable TV networks, satellite communication links, and telephone networks. The apparatus and method of the invention are also suitable for the protection of software program information that is stored in read-write memory devices, such as random access memories. The apparatus and method of the invention provide protection against illegal copying, duplication, and unauthorized use of software program code and information.

It is therefore an object of the invention to provide a software protection apparatus and method utilizing read-write memory device having output data that is inconsistent with corresponding input data to prevent an infringer from acquiring the correct software program stored in the memory device by utilizing a microprocessor emulator.

It is another object of the invention to provide a software protection apparatus and method utilizing read-write memory device having output data that is inconsistent with corresponding input data to prevent an infringer from acquiring the correct software program stored in the memory device by monitoring the read-write access operations in the memory device.

It is a further object of the invention to provide a software protection apparatus and method utilizing read-write memory device having output data that is inconsistent with corresponding input data to prevent an infringer from intercepting the correct software program during the process of downloading the program from a distribution source via channels such as cable television networks, satellite communication links, and telephone networks.

BRIEF DESCRIPTION OF THE DRAWINGS

These and other objects, features, and advantages of the invention will become apparent by way of the following detailed description of the preferred but non-limiting embodiments. The description is made with reference to the accompanying drawings in which.

DESCRIPTION OF THE PREFERRED EMBODIMENTS

Figure 2:
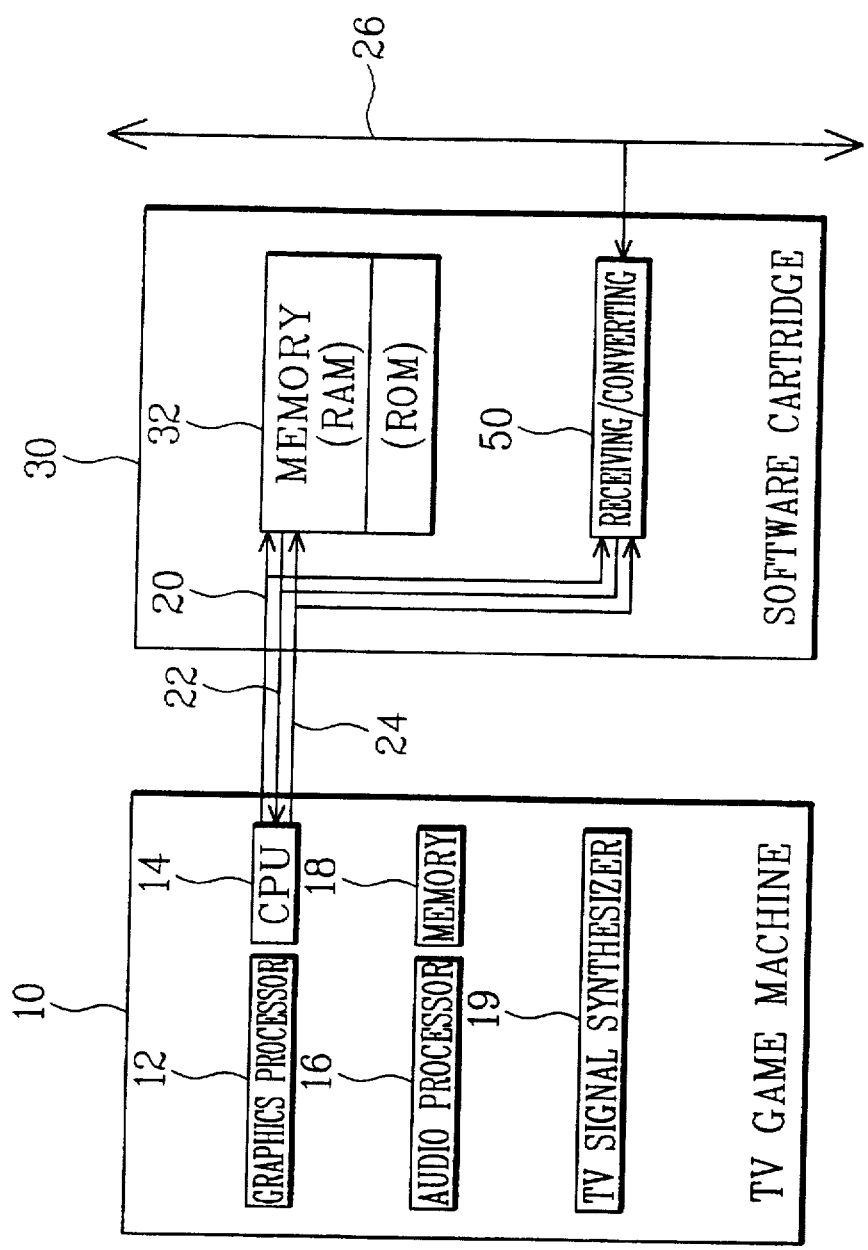
FIG. 2 is block diagram of a conventional TV game system that receives a broadcast downloaded software program.
Figure 4:
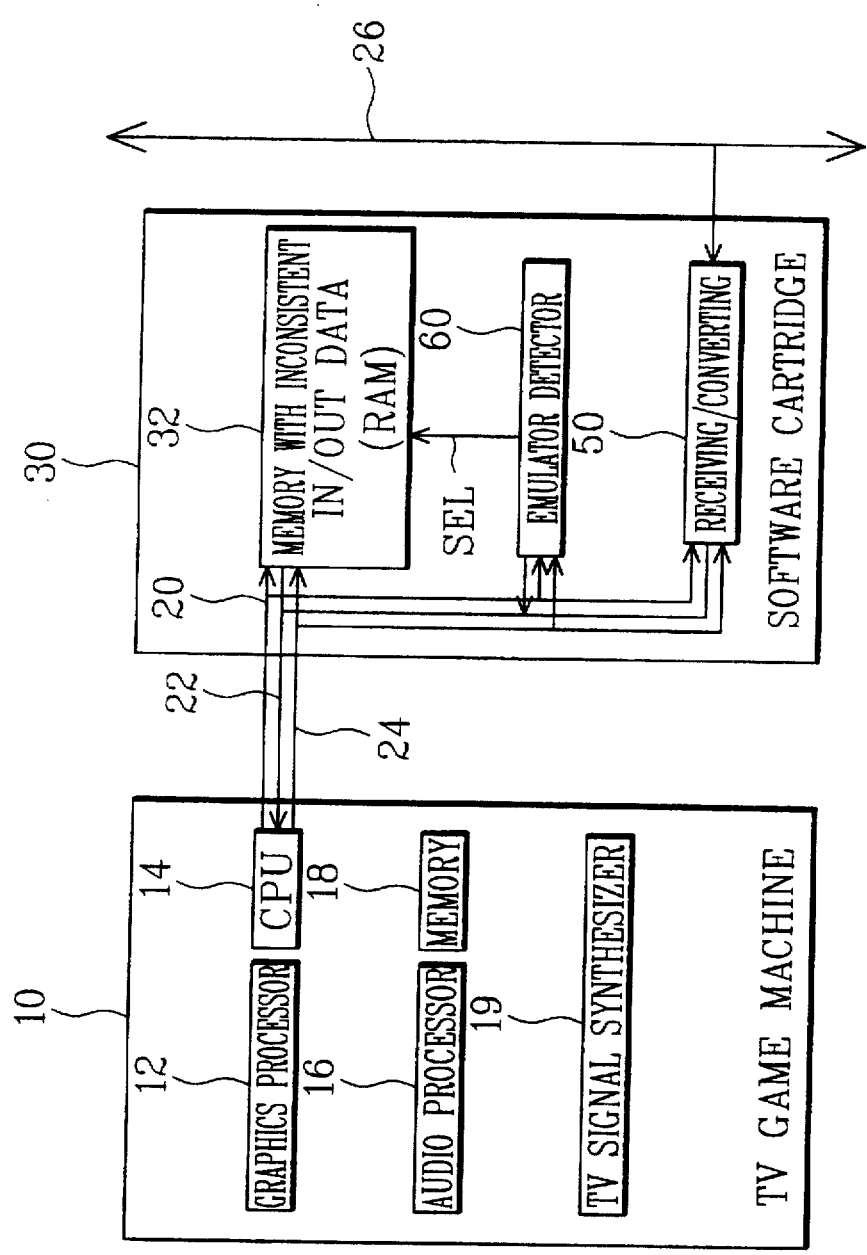
FIG. 4 is a block diagram of a TV game system featuring the software protection apparatus for performing the protection method in accordance with the invention that receives a software program downloaded over a broadcast channel.

The protection of a software program against unauthorized copying from storage is generally an effort to resist memory access attempts by external data access devices. The external data access device used may be a microprocessor emulator that mimics the CPU of the target system and attempts to steal the stored code. FIG. 4 shows the block diagram of a TV game system employing the software protection apparatus in accordance with the invention. The TV game system shown in FIG. 4 is an implementation similar to that shown in FIG. 2 for the conventional electronic configuration. The game console 10 preserves the architecture of conventional systems, while the architectural configuration of the software program cartridge 30 is changed, and is seen to comprise a read-write memory device 32 having output data that is inconsistent with the corresponding input data, an emulator detector 60, and a receiver/converter 50. The emulator detector 60 employs a detector to monitor the activities of the address bus 20, the data bus 22, and the control bus 24. When a memory access operation is detected that should not occur under normal conditions, for example, the trapping of an address location, this signifies that the memory contents are being dumped sequentially by a governing microprocessor emulator.

The apparatus of the invention can perform two methods for conducting error against such emulator dumping attempts. One method is the mode-switch protection method, in which the emulator detector 60 utilizes a mode control select signal SEL to control the operation of the inconsistent read-write memory device 32 so that erroneous data is read out continuously or intermittently when an emulator program dumping attempt is detected. According to this method, the mode control select signal serves as a control signal that controls the switching of the output mode of the memory device. The other method for conducting error against emulator dumping attempts is the interference protection method, in which the emulator detector 60 interferes with the external emulator dumping attempt by continuously or intermittently pulling the signal lines in the address bus 20, data bus 22, and control bus 24 up to the system power supply ($V_{cc}$) or down to the ground (GND) potential, so as to result in an erroneous data dump. Using this second method, there is no mode control select signal SEL issued by the emulator detector 60 to the memory device 32.

Figure 3:
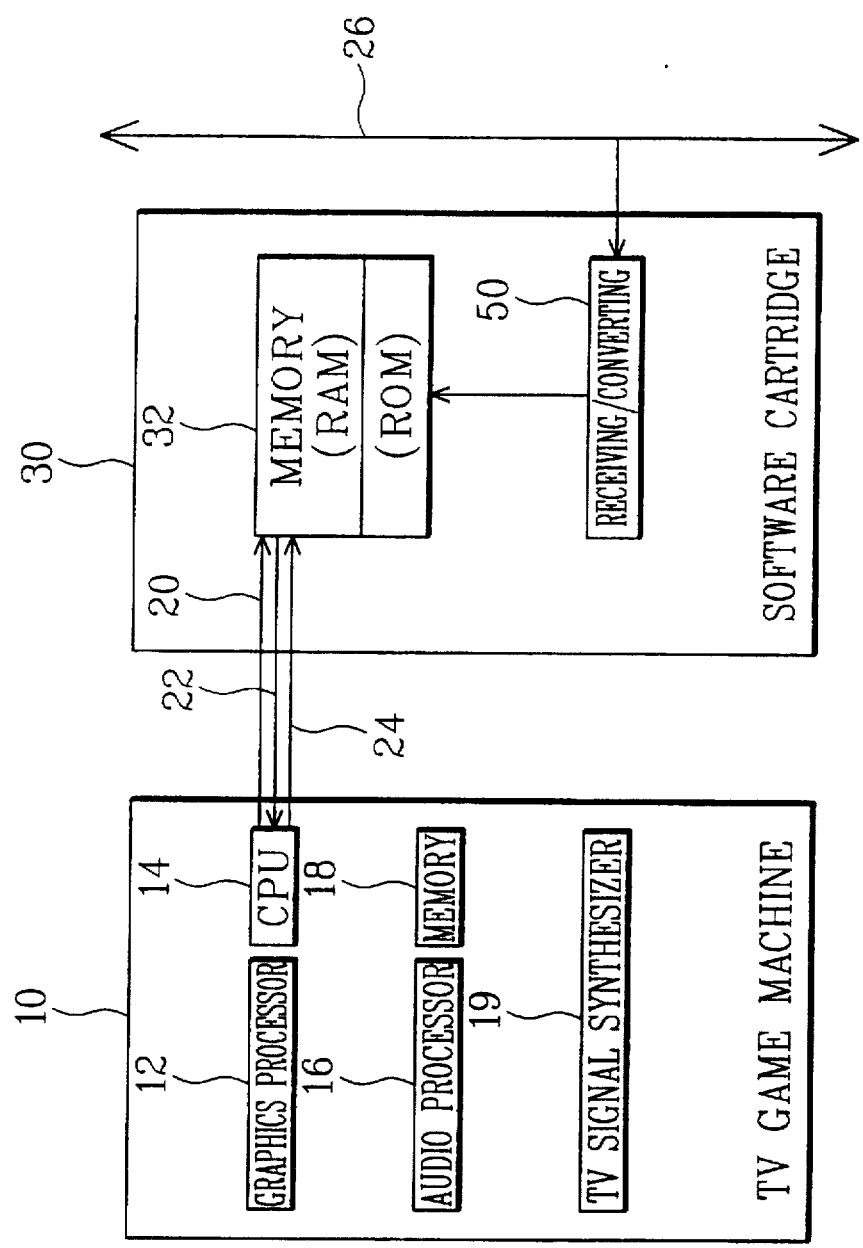
FIG. 3 is a block diagram of another conventional TV game system that receives a broadcast downloaded software program.
Figure 5:
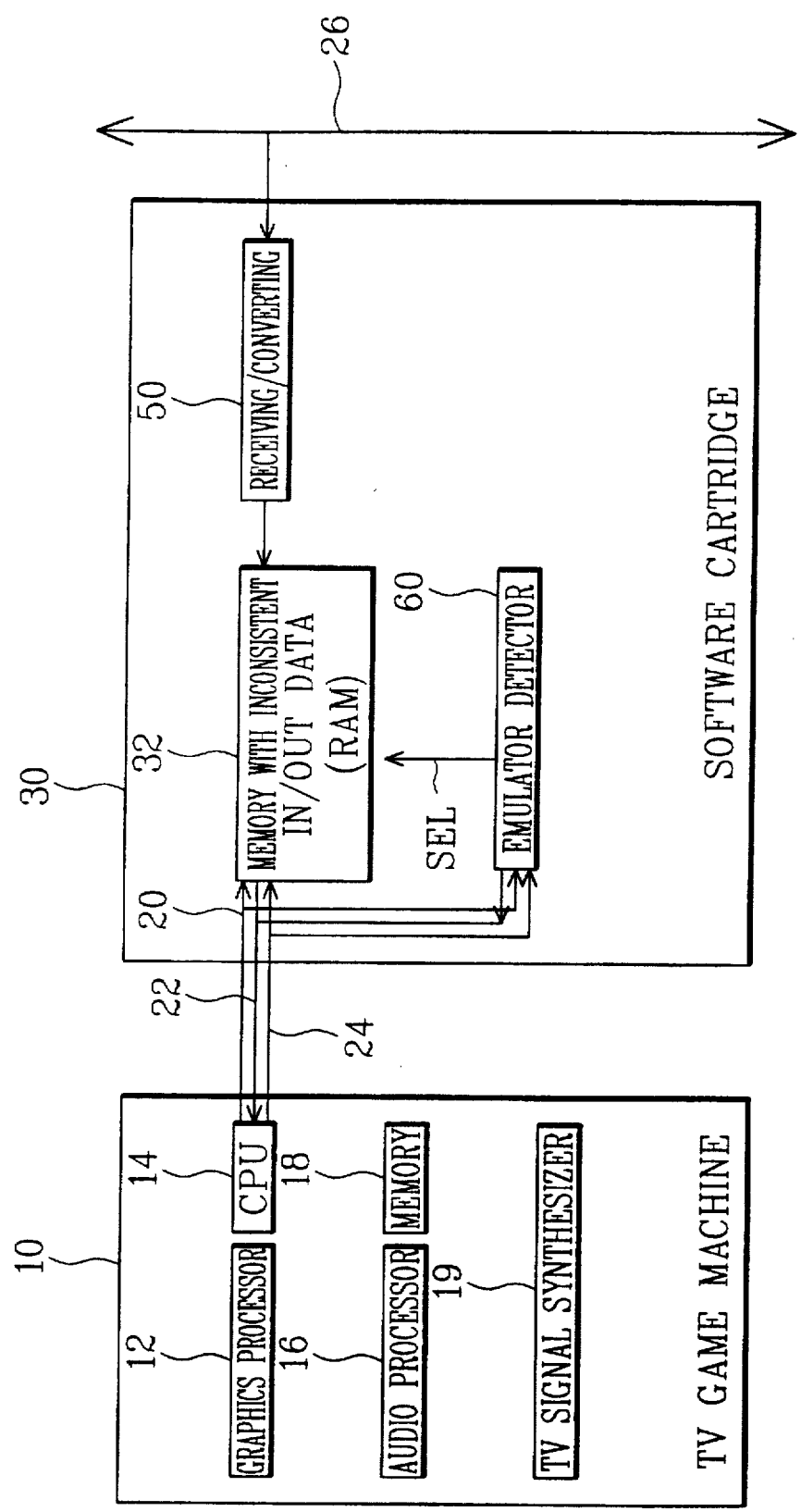
FIG. 5 is a block diagram of a TV game system featuring the software protection apparatus for performing the protection method in accordance with the invention that receives a software program downloaded over a broadcast channel.

FIG. 5 is a block diagram of the electronics of a TV game system embodying another architectural structure of the invention. This game system is based on the conventional architecture of FIG. 3 and has a basic operating principle similar to that of FIG. 4. The arrangement of the receiver/converter 50 in the embodiment of FIG. 5 is different in that it is not directly coupled with the emulator detector 60 as in the case of FIG. 4.

Figure 6:
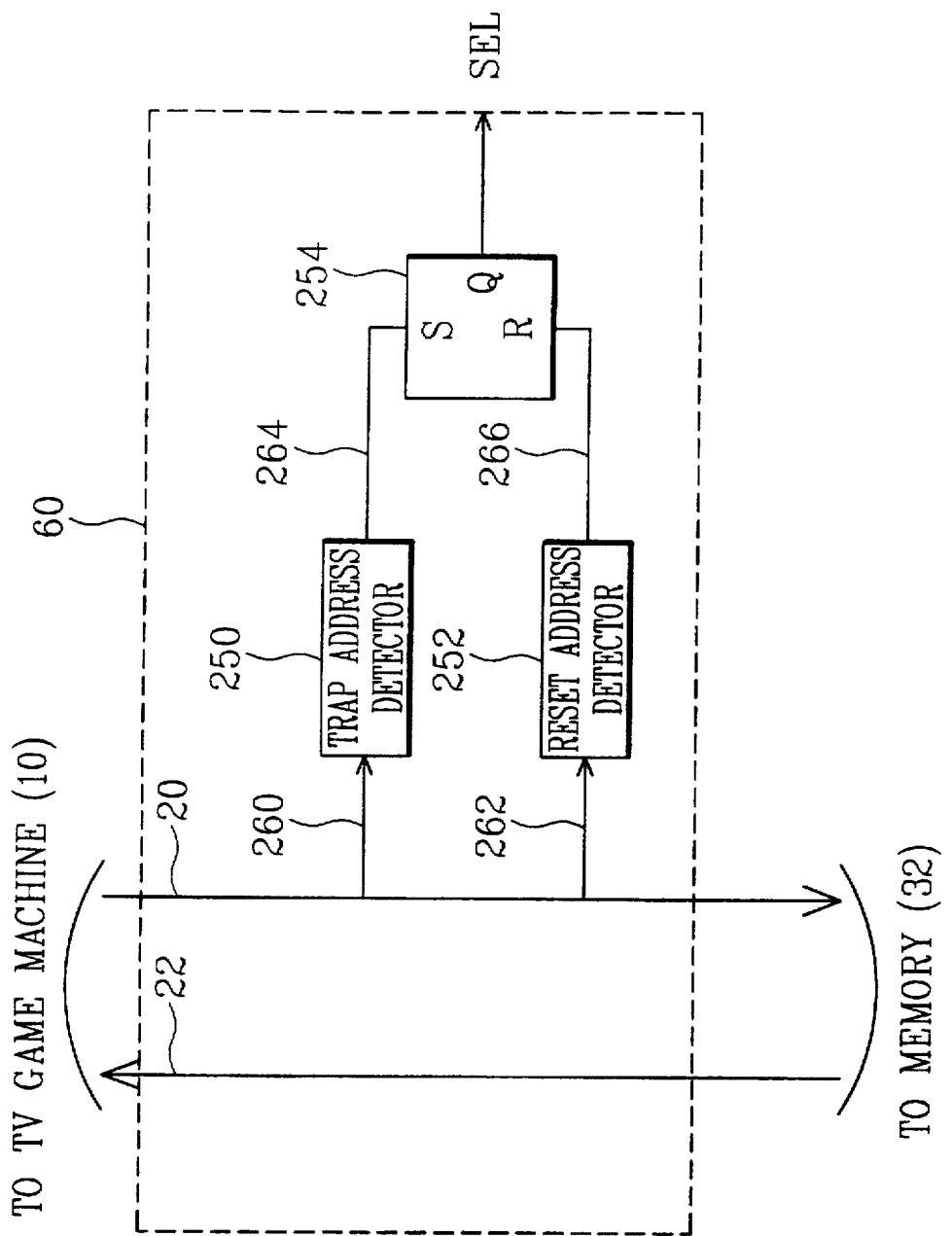
FIG. 6 is a block diagram of an embodiment of the circuit configuration of the emulator detector of the invention.

FIG. 6 is a block diagram of an embodiment of the circuit configuration of the emulator detector 60 of the invention. The emulator detector 60 is shown to include a trap address detector 250, a reset address detector 252, and an RS latch 254. When the system is initiated, the CPU 14 of the conventional game console 10 will normally start the execution of code at a particular designated address location. Based on this information, the reset address detector 252 may be utilized to detect this particular address location over its address monitoring lines 262 coupled to the address bus 20 and to reset the RS latch 254 if the correct address is detected. Through signal line 266 that connects to the R input of the RS latch 254, the Q output of the RS latch 254, and thus the mode control select signal SEL, may be preset to a low logic level when the system is initiated. Signal line 266 is not directly connected to the system reset line to avoid the perpetual reset of the mode control select signal SEL, and therefore, the entire system, which would disable protection. Essentially, the direct connection of signal line 266 to the system reset line, however, is in fact possible and may allow for copy protection if an alternative method is used.

After the system is initialized, trap address detector 250 starts monitoring the address bus 20 to see if there is any read access address present that was issued by the CPU 14 of the game console 10. A typical game machine does not access the entire address space of its memory, and in fact, software programs may be designed to intentionally avoid access of certain designated address locations. In other words, the address locations that are intentionally not used will never be accessed by the CPU 14 of the game machine system during normal operation of the system, and these addresses should never appear on the address bus 20. This fact and the actual locations of these suspect addresses, will not be known to potential infringers of the software programs sought to be protected. They do not know which address locations are normally accessed and which are not.

Once, however, any of these "trap" locations is accessed by a microprocessor emulator used by the infringer in an attempt to dump the memory contents, the trap address detector 250 will detect this access attempt when decoding the address, indicating to the trap address detector 250 that an illegal access is being attempted by an external device. When an illegal access attempt is detected, the trap address detector 250 issues a set signal to the S input of the RS latch 254 over signal line 264 and the Q output of RS latch 254 is set to a high logic level. The mode control select signal SEL therefore is set to a logic high as a result. The type of emulator detector 60 exemplified in FIG. 6 is suitable for implementing the continuous software protection method of the invention. The method interferes with the illegal attempt to dump code by utilizing the mode control select signal SEL in a manner to be described below. As a result, the data read out of the inconsistent memory device 32 is erroneous for a continuous block of data accessed. The size of this block of data may be predetermined, or it may be the same size as the block of data defined by the illegal addresses accessed.

Figure 7:
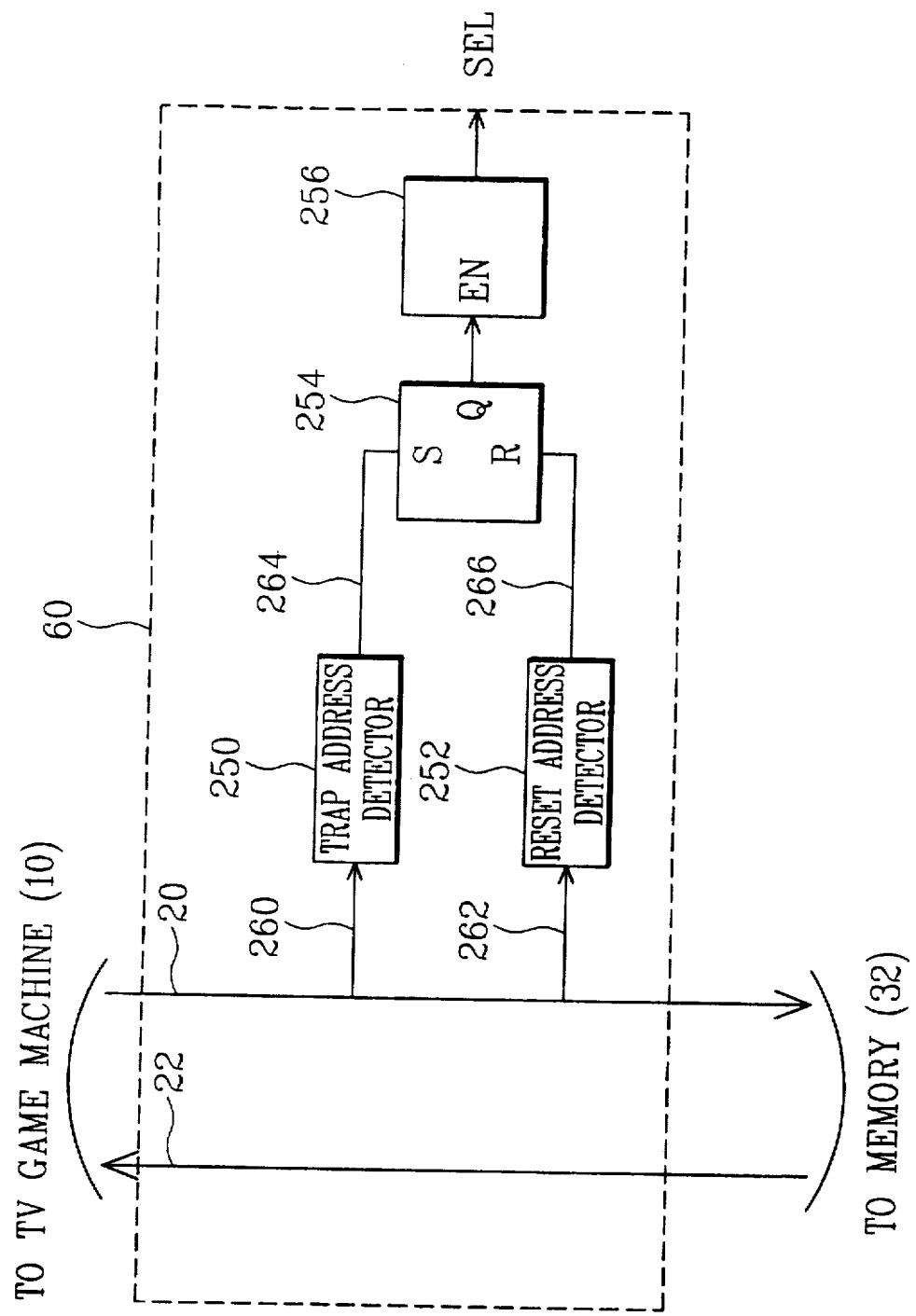
FIG. 7 is a block diagram of another embodiment of the circuit configuration of the emulator detector of the invention.
Figure 11:
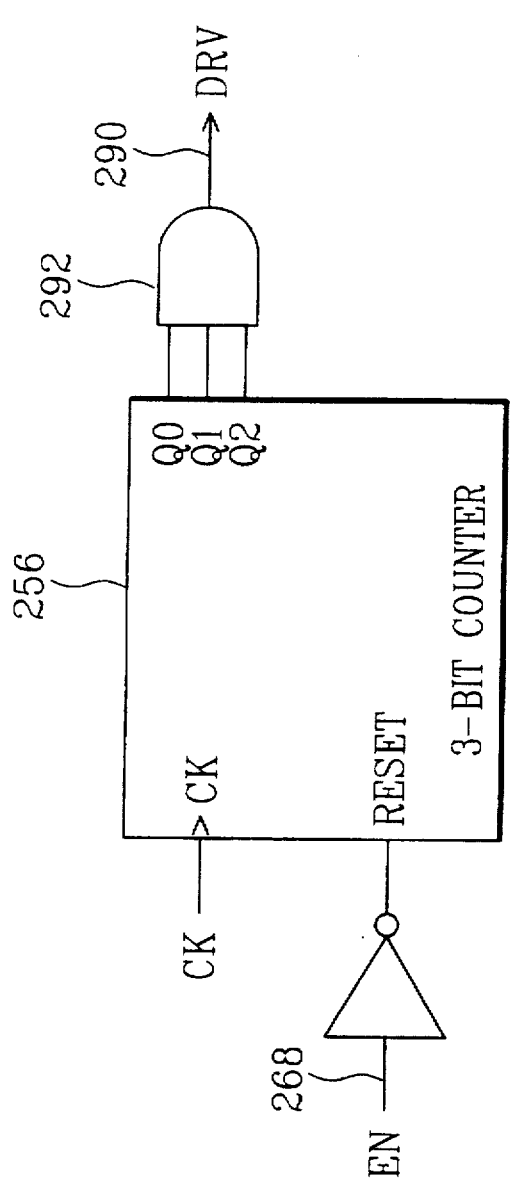
FIG. 11 is a schematic diagram of an embodiment of the intermittent signal generator of the invention, for initiating emulator program dumping interference.

The circuit configuration of the emulator detector 60 shown in FIG. 7 is generally similar to that in FIG. 6, a difference being the use of an additional signal generator 256 connected to the Q output of the RS latch 254. This arrangement allows the emulator detector to provide software protection by intermittently forcing the data issued by the memory device 32 to be erroneous when it is illegally accessed. The Q output of the RS latch 254 in this emulator detector 60 is connected to the enable input EN of the signal generator 256. When the Q output of the RS latch 254 is a logic high, the signal generator 256 will be enabled, and its output signal will become the mode control select signal SEL for the detector 60. The output signal of the signal generator 256 is not a constant level, that is, it varies in a manner that may be, for example, periodic, intermittent, or random, providing a switched mode control select signal SEL and therefore switched application of erroneous data from the memory 32. The schematic diagram shown in FIG. 11 depicts an exemplary embodiment of this intermittent signal generator of the invention, which will be described below.

Figure 8:
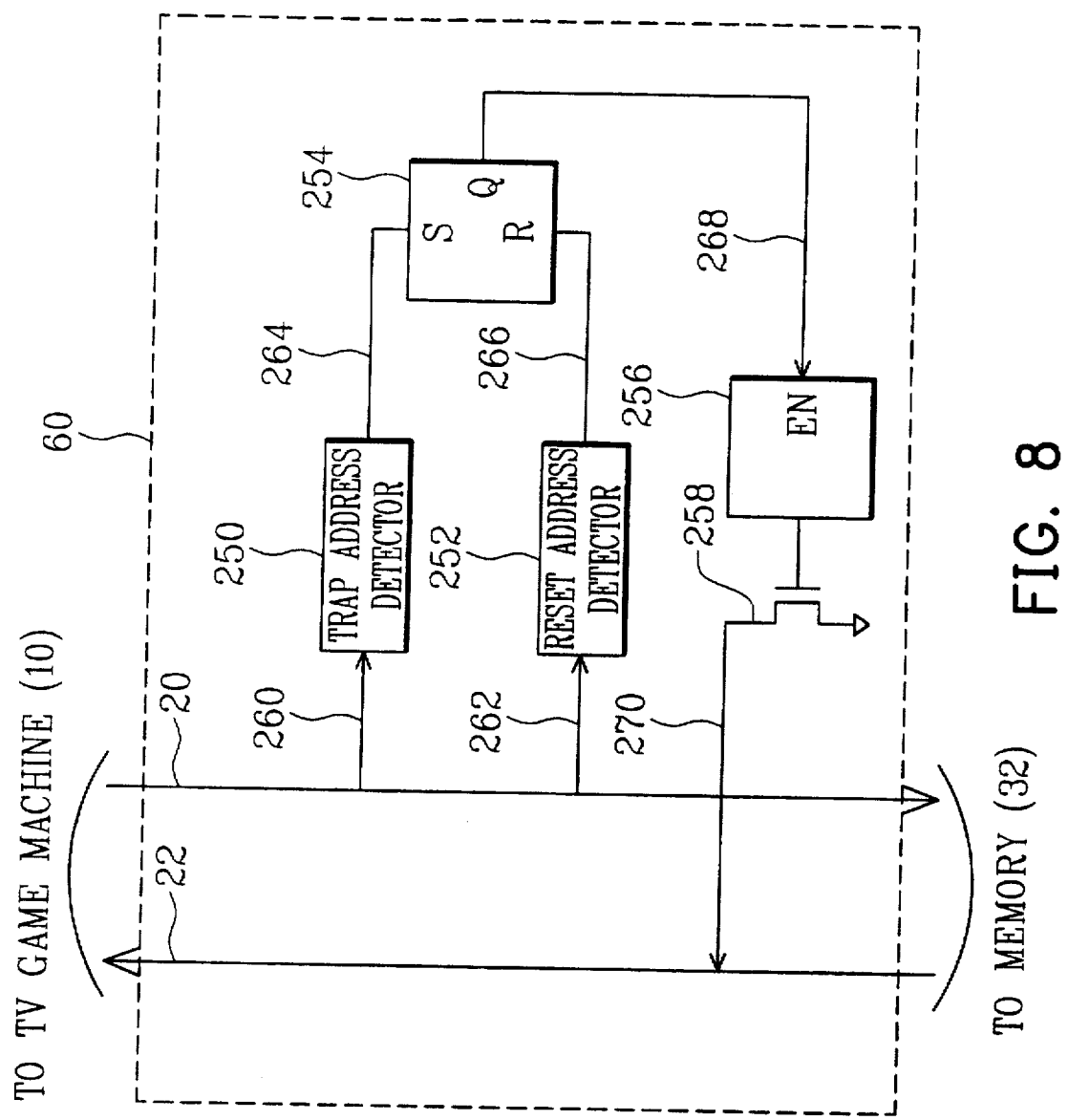
FIG. 8 is a block diagram of an embodiment of the circuit configuration of the emulator detector that provides interference with an unauthorized memory access.
Figure 9:
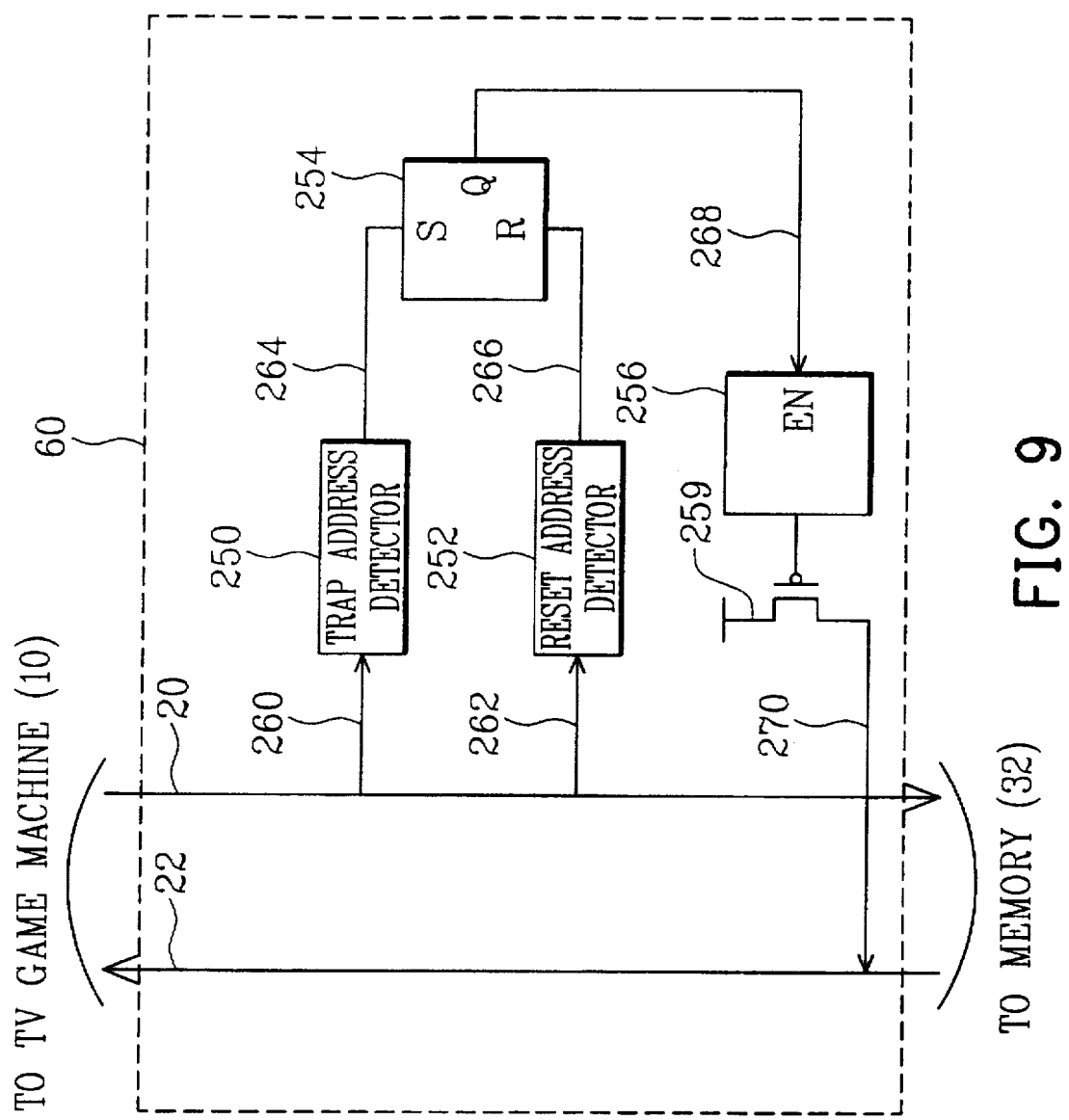
FIG. 9 is a block diagram of another embodiment of the circuit configuration of the emulator detector that provides interference with an unauthorized memory access.

FIGS. 8 and 9 are block diagrams of two circuit configurations for the emulator detector 60, which are similar to the emulator detector design of FIG. 7, with the addition of an interference device for deterring attempts to dump software program code. The signal generator 256 is employed to generate a signal that drives an NMOS FET 258 or a PMOS FET 259 shown in FIGS. 8 and 9 respectively.

One terminal of the FET 258 or 259 is connected to a selected signal line 270 of either the address bus 20, the data bus 22, or the control bus 24, (connection to the data bus 22 is shown as an example in FIGS. 8 and 9) while the other terminal is connected to the reference low potential (GND) (shown in FIG. 8) or high potential ($V_{cc}$) (shown in FIG. 9) of the system. Whenever the driving signal output of the signal generator 256 turns on the FET 258 or 259, the signal line 270 is then pulled down or up to the system GND or $V_{cc}$ potential respectively. This forces the tied address line, data line, or control line to the ground or power potential of the system, resulting in an erroneous attempted software code dump, or, in some cases, a system malfunction. This design for the emulator detector interference device is therefore suitable for implementing the interference method of software protection described previously. Incorrect data thus will be fetched by the inconsistent memory device 32 in an indefinite time scheme when accessed by an external microprocessor emulator. Essentially, if the signal generator 256 is required to produce a continuous and sustained signal, so that the inconsistent memory device 32 may fetch incorrect software program data continuously, it is only necessary to remove the signal generator 256 altogether.

Figure 1:
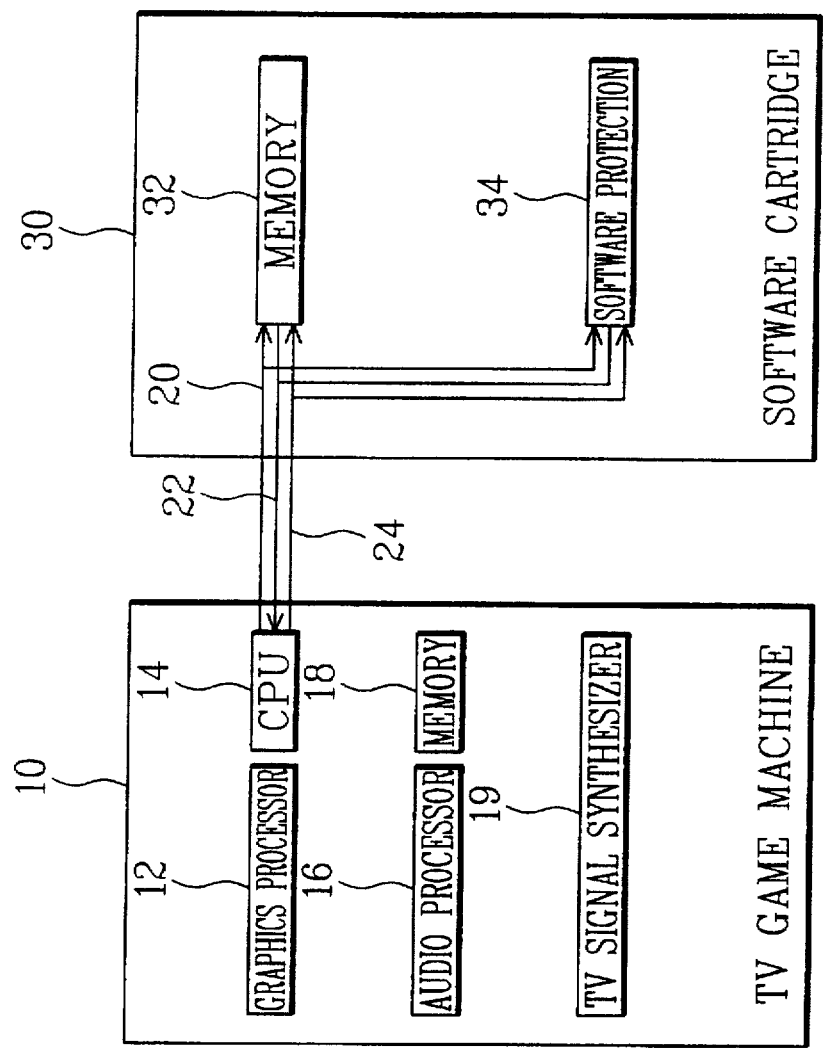
FIG. 1 is a block diagram of a conventional TV game system that comprises a game machine and a game software cartridge.
Figure 10:
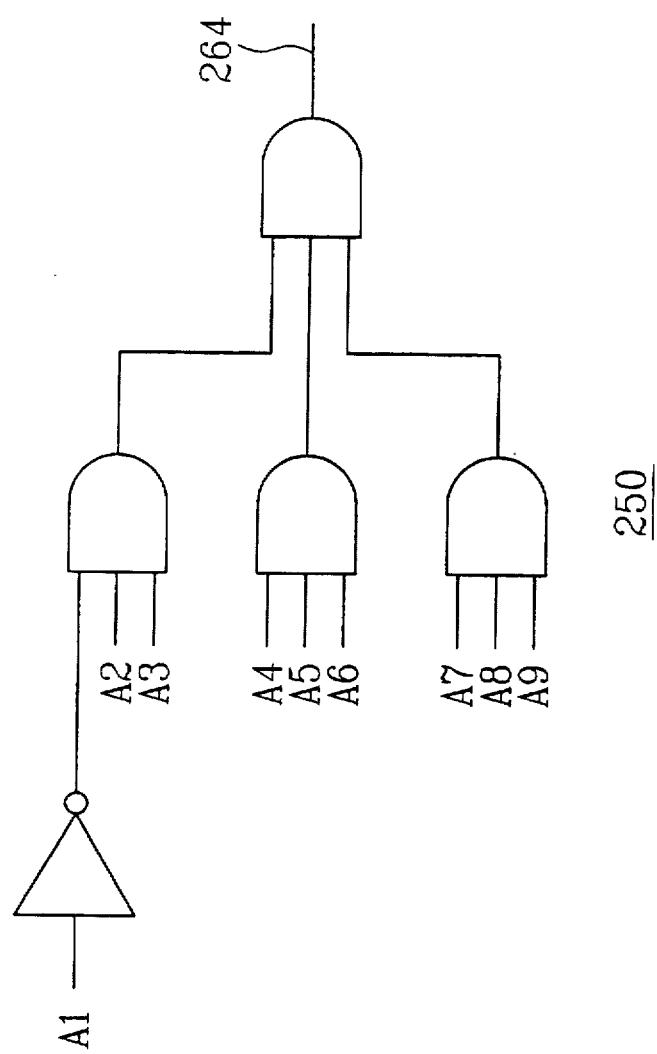
FIG. 10 is a schematic diagram of an embodiment of the trap address detector of the invention.

FIG. 10 shows the schematic diagram of an example trap address detector (250 in FIGS. 6–9) of the invention. This is detector circuitry that decodes the read access address signal lines, for example, A1–A9 issued by the CPU 14 of the system machine (such as the game console 10 in FIG. 1) over the address bus 20. Such trap address detector comprises inverters and AND gates arranged in a circuit combination to implement the address decoding. The result of the decoding is sent to the S input of the RS latch 254 (FIGS. 6–9) over signal line 264 for the timely triggering of the signal generator 256, or for use as the mode control select signal SEL as described previously. The trap address detector circuitry shown in the example of FIG. 10 detects only a single nine-bit address (111111110, assuming that A9 is the most significant bit) and sets the RS latch if that address is detected by putting a high logic level on signal line 264. If the entire memory address is actually greater than nine bits, a nine-bit block of addresses is detected. Different circuits based on this design can be used to accommodate longer addresses. As is well known to those of skill in the art, various combinations of inverters, AND gates, and OR gates may be used to design a circuit to detect any address or group of addresses. A similar design may be utilized for the reset address detector 252.

FIG. 11 shows the schematic diagram of an example design for the intermittent signal generator 256. The intermittent signal generator 256 used by emulator detector 60 of FIGS. 7, 8 and 9 may comprise, for example, a three-bit counter as is shown in the drawing. A counter clock input CK from an external clock source not shown in the drawing is utilized to trigger the counter to progressively count and provide a status of the count on its three counter output bits Q0, Q1 and Q2. A simple logic function element such as the three-input AND gate 292 shown in the drawing may be utilized to perform a simple logic operation on the counter bits Q0–Q2. The resulting output of gate 292 would then be the mode control select signal SEL as shown in the circuit of FIG. 7, or the output can be conveyed via the DRV signal line 290 to drive the NMOS FET 258 or the PMOS FET 259 shown in FIG. 8 or 9 respectively. It will be apparent to those of ordinary skill in the art that myriad designs may be used to effect an intermittent signal generator suitable for use with the invention.

Figure 12:
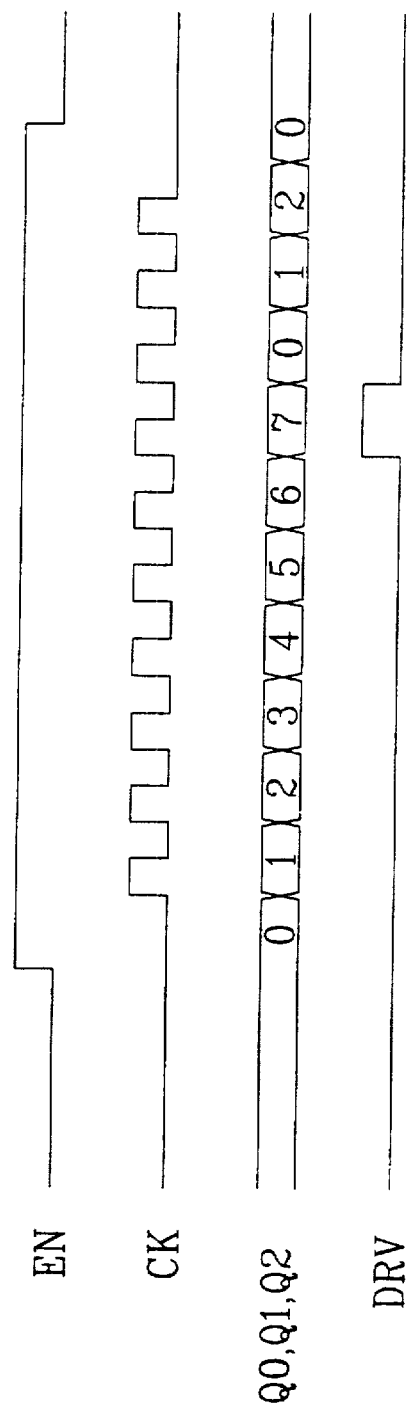
FIG. 12 is a time-sequence diagram of the time sequence of the signals provided by the signal generator of FIG. 11.

FIG. 12 is a time-sequence diagram that shows the timing sequences of signals EN, CK, Q0–Q2 and DRV in the intermittent signal generator 256 of FIG. 11. As is clearly seen in the time-sequence diagram, the DRV signal line 290 generated by the three-input AND gate 292 decodes a logic high when the 3-bit counter is enabled and when each of the counter bits Q0–Q2 outputs a logical one, that is, when the counter 256 counts to "7." Different logic can be applied to the counter output to provide particular desired SEL or DRV signals.

Figure 13:
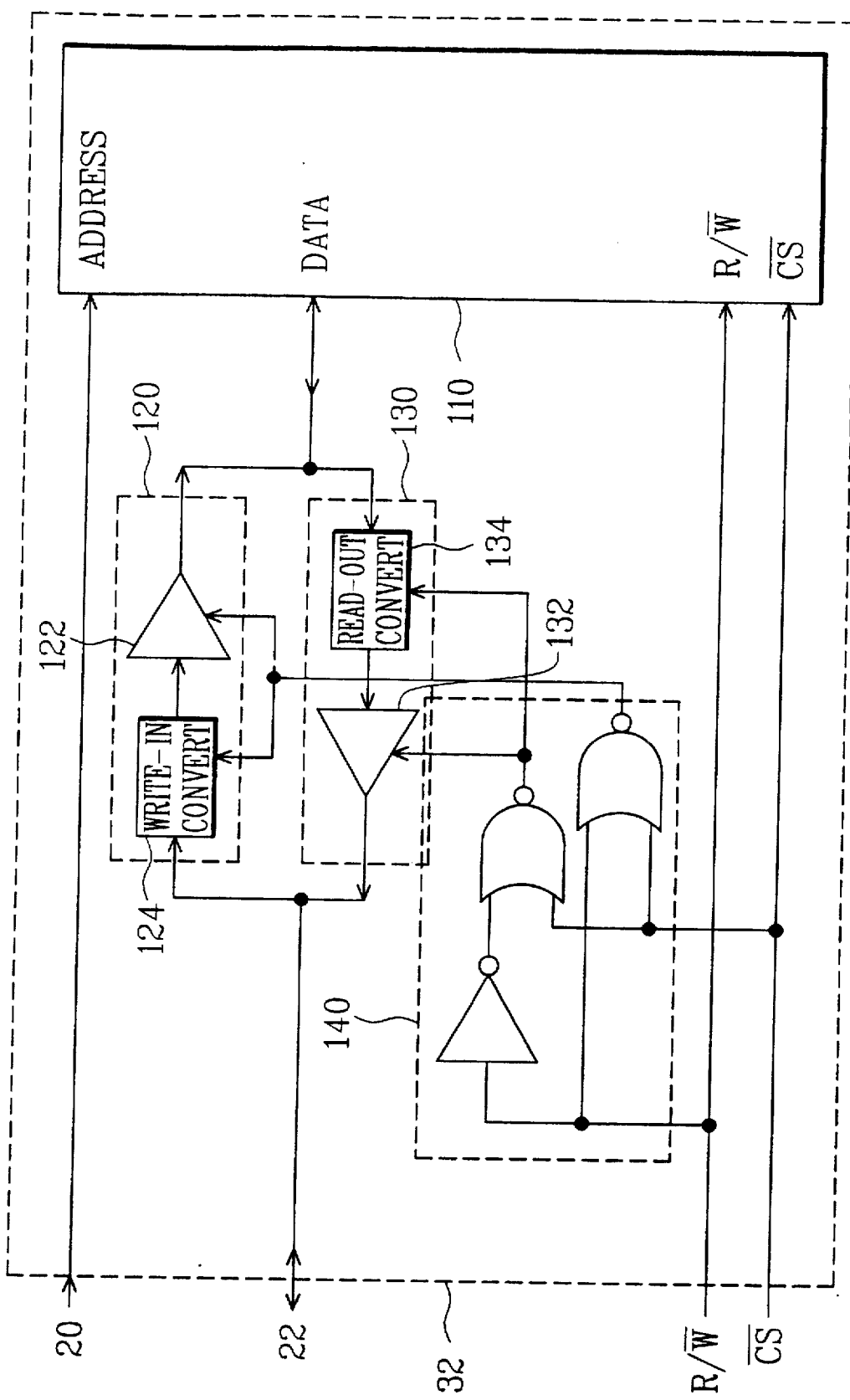
FIG. 13 is a schematic diagram of the memory device in accordance with the invention that provides inconsistencies in the data written into and read out of the memory storage.

A circuit configuration of the memory device 32 employed in the TV game system, which features the software protection method in accordance with the preferred embodiments of the invention as depicted in FIGS. 4 and 5, is shown in FIG. 13. As shown in the drawing, the memory device 32 of the invention comprises a read-write memory 110, a data write-in converter 120, a data read-out converter 130, and data read-write conversion control logic 140. The write data converter 120 and the read data converter 130 are coupled to the data lines DATA and to the external data bus 22 in order to provide a data relay when software program data is to be written into or read out of the memory 110, which is also coupled to the data lines DATA. The address location for accessing the memory 110 is, however, conveyed from the external address bus 20 directly to the memory 110 address lines ADDRESS. The read/write control and chip select strobe signals R/$\overline{W}$ and $\overline{CS}$ are also provided directly to the memory 110 as shown in the drawing.

The write-in converter 124 and read-out converter 134 are provided for the write data converter 120 and read data converter 130, respectively. These converters 124 and 134 are combined with tri-state buffers 122 and 132, respectively, which are used as output controllers in order to control the bi-directional data flow over the data path between the data bus 22 and the DATA lines of the memory 110. The data read-write conversion control logic 140 comprises digital logic circuitry that receives the memory read/write strobe signal R/$\overline{W}$ and the chip select signal $\overline{CS}$ as inputs and issues control signals to the write data converter 120 and the read data converter 130 for the control of data flow between the memory 110 and the external data bus 22. As outlined in the drawing, these control signals control the write-in converter 124 and the read-out converter 134, as well as their corresponding output controllers, the tri-state buffers 122 and 132, in the write data converter 120 and read data converter 130 respectively.

Figure 15:
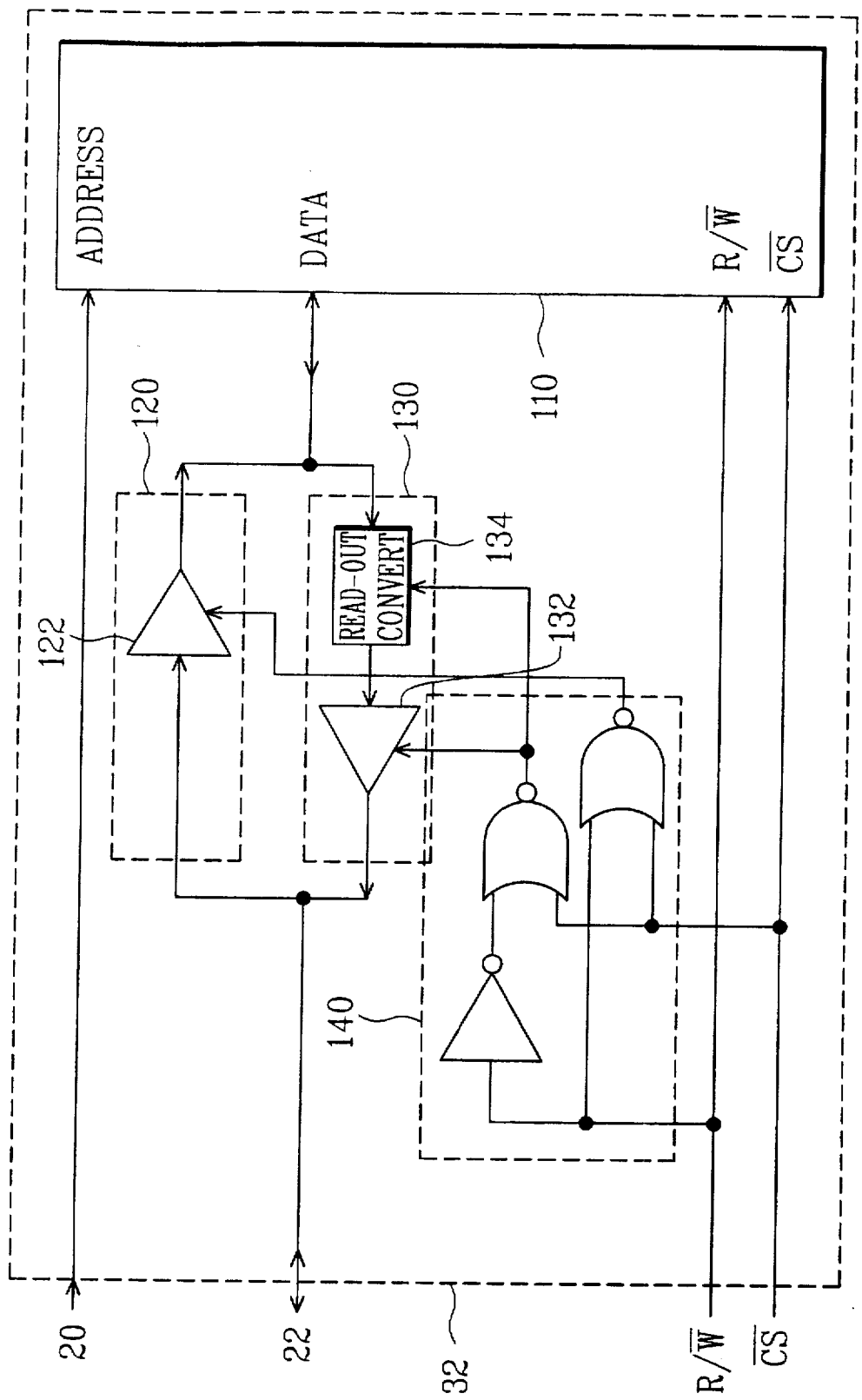
FIG. 15 is a schematic diagram of the memory device in accordance with the invention as outlined in FIG. 13, but without the implementation of write-in conversion for data to be stored in the memory device.

This configuration is suitable for use in implementing the mode-switch software protection method. The software protection may be achieved by enabling conversion in either the read-out data or write-in data, or conversion in both the read-out and write-in data, thereby producing inconsistencies in the chosen data path. In contrast, the embodiment shown in FIG. 15 is essentially the same circuit design, with the exception that it features only read-out conversion for the memory 110 and therefore only allows conversion in the read-out data. As shown, the write-in data to the memory 110 is still controlled by tri-state buffer 122, but is passed unconverted. Using either memory device design, unauthorized microprocessor emulators will not be able to break the software protection method of the invention by simply dumping the contents of the memory 110.

A detailed description of the operation of the memory device 32 as outlined in FIG. 13 is given below. When the chip select signal $\overline{CS}$ is brought to a high logic level, both the write data converter 120 and the read data converter 130 will be controlled by a low logic level signal that disables both the data conversion and output controllers in both the in and out paths of the data flow. This disrupts the data access to and from memory 110 via the data bus 22. When, however, the chip select signal $\overline{CS}$ is enabled, that is, measures a logic low, and the read/write strobe signal R/$\overline{W}$ has a write-in status, that is, also is set to a logic low level, the write data converter 120 will be enabled and the data path over the write-in route will be enabled. This allows the data coming from the data bus 22 to be converted by the write-in converter 124 and then written into the location in memory 110 designated by the address conveyed over the address bus 20. While this occurs, the data read-out path remains disabled. Conversely, when the read/write strobe signal R/$\overline{W}$ has a read-out status, that is, is set to a high logic level, the read data converter 130 is enabled and the data path on the read-out route will be enabled. This allows the data coming out of the storage locations in memory 110 designated by the address conveyed over the address bus 20 to be converted by the read-out converter 134 and sent over the data bus 22. While this occurs, the data write-in path remains disabled.

Figure 14:
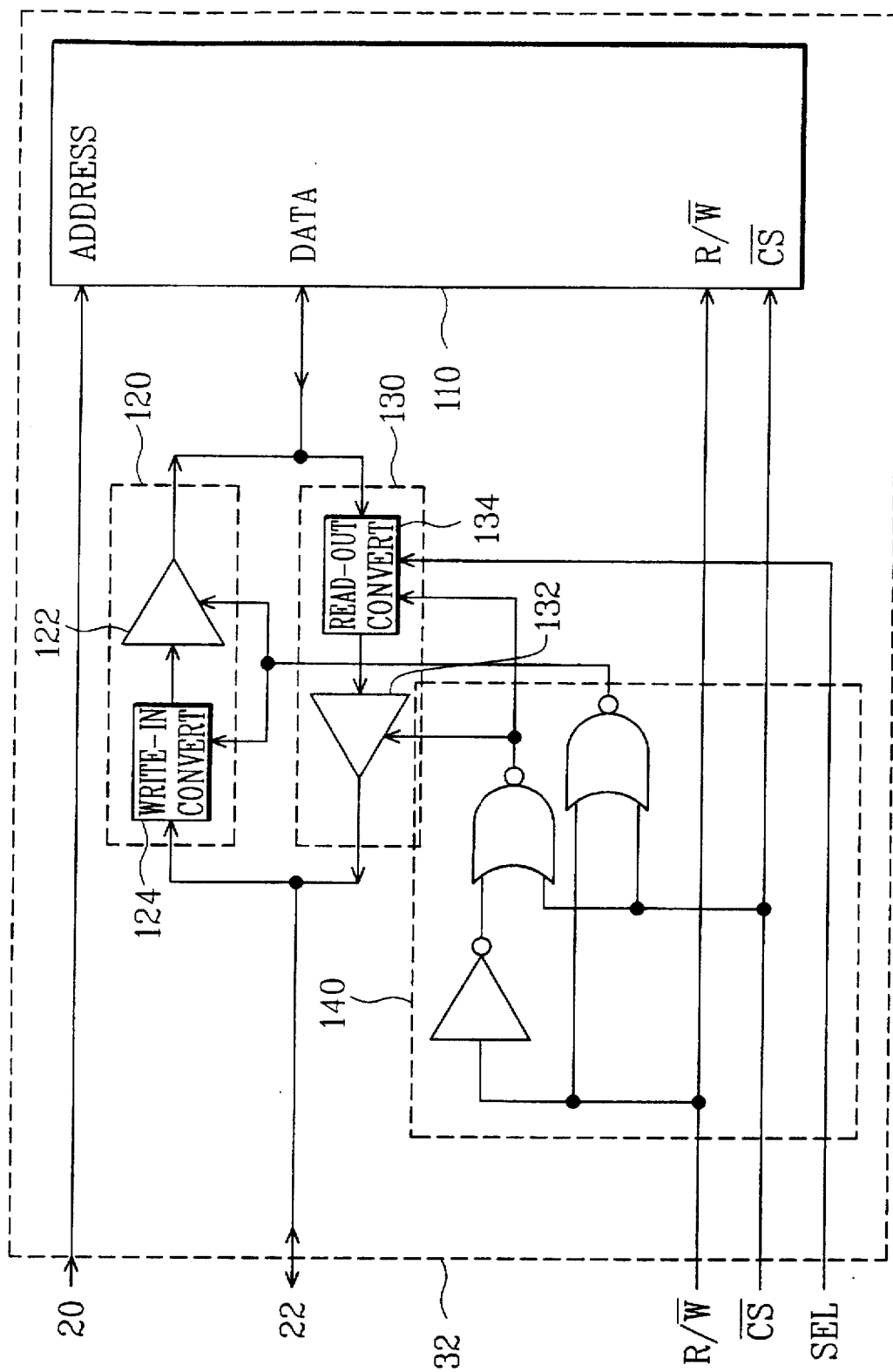
FIG. 14 is a schematic diagram of the memory device in accordance with the invention that provides a mode control to facilitate an erroneous data dump during detected illegal access occasions in addition to the inconsistencies in the data written into and read out of the memory storage.

FIG. 14 is a schematic diagram showing the block diagram of the memory device 32 in accordance with another embodiment of the invention. This depicted memory device 32 provides a mode control selection in the data read-write conversion control logic 140 to force incorrect data dumping in case of a detected illegal access, which is provided in addition to the inconsistencies in the data written into and read out of the memory storage. The electronic configuration depicted in FIG. 14 is basically the same as that shown in FIG. 13. However, the mode control select signal SEL generated by the emulator detector 60 as described above is incorporated herein as an additional control factor.

Figure 16:
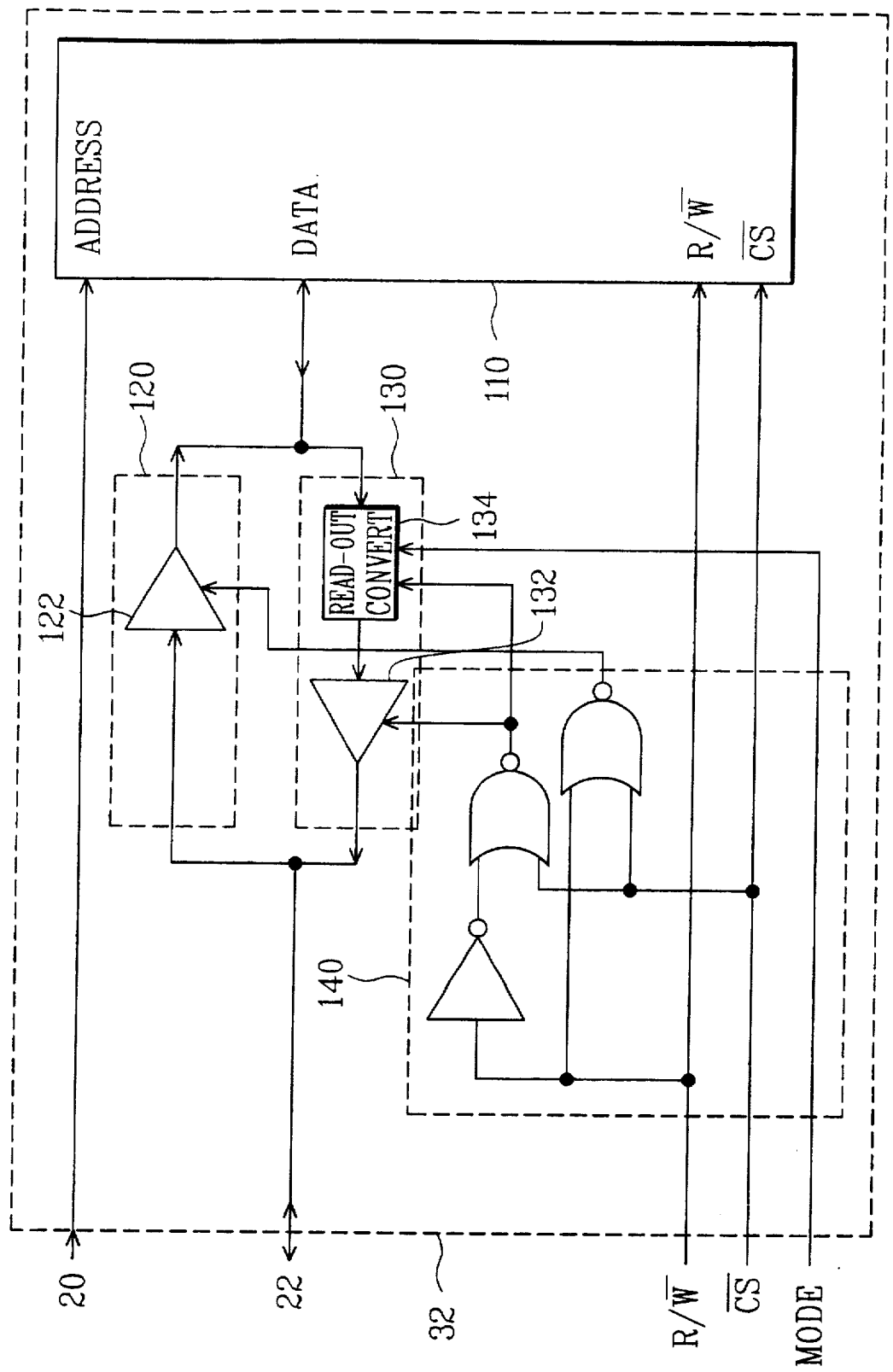
FIG. 16 is a schematic diagram of the memory device in accordance with the invention as outlined in FIG. 14 but without the implementation of write-in conversion for data to be stored in the memory device.

This mode control select signal is utilized to further control the read-out converter 134 in the read data converter 130, so that data retrieved out of storage in memory 110 may be set either to the normal output or to the deliberately interfered erroneous output mode as determined by the status of the mode control select signal SEL. In other words, during normal operation of the system, the read-out converter may maintain its normal conversion, while when it is determined by the emulator detector that an illegal access by an externally inserted microprocessor emulator is attempted, the mode control select signal may then be activated, pulling up or down the data retrieved out of memory 110, thereby interfering with the illegal dumping. An alternative embodiment shown in FIG. 16 features only read-out conversion for memory 110 and therefore only allows conversion in the read-out data. As shown, the write-in data to the memory 110 is still controlled by tri-state buffer 122, but is passed unconverted.

Figure 17:
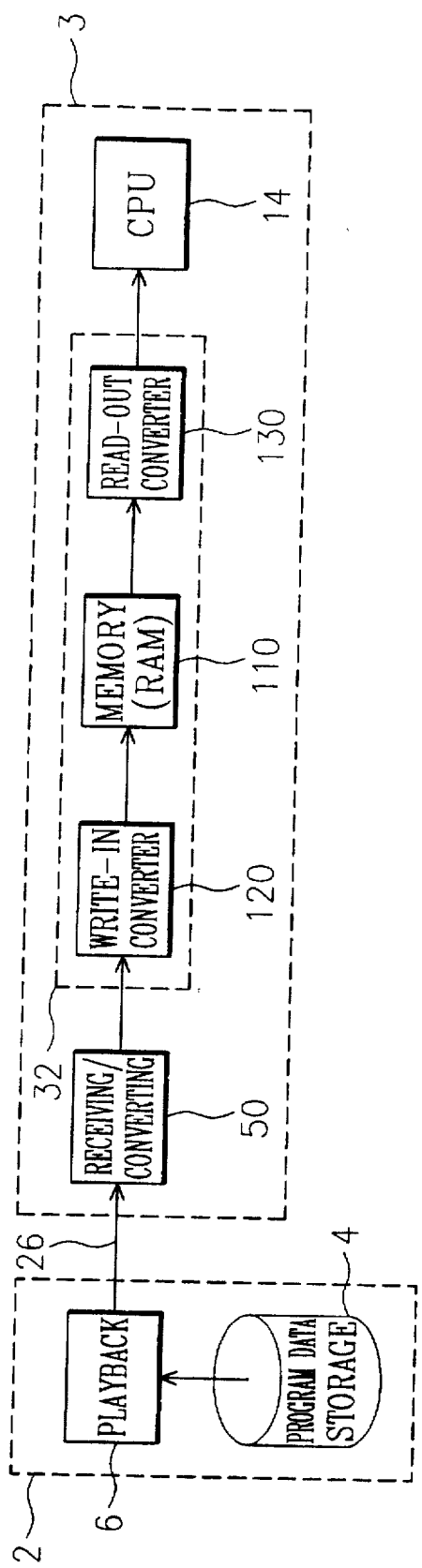
FIG. 17 is a block diagram of an embodiment of the system configuration of the software protection apparatus of the invention.

The system architecture of an apparatus employing the software protection method of the invention is now examined. FIG. 17 is a block diagram showing an embodiment of the system configuration of the software protection apparatus of the invention. A complete system for the apparatus of the invention will include a distribution end 2 and a user end 3. The software program distribution end 2 comprises a software program data storage 4 and a playback device 6 (or a broadcasting device). The program storage 4 is utilized for the storage of software programs to be distributed remotely to the users, while the playback device 6 serves to transmit the software program stored in the program storage 4 to the user at the user end 3. As described above, the transmission may, for example, take place over the broadcast channel 26 shown in the drawing. Before the playback means 6 initiates its transmission procedure, however, the data stored in the program storage 4 may first be processed using an encryption procedure.

Figure 18:
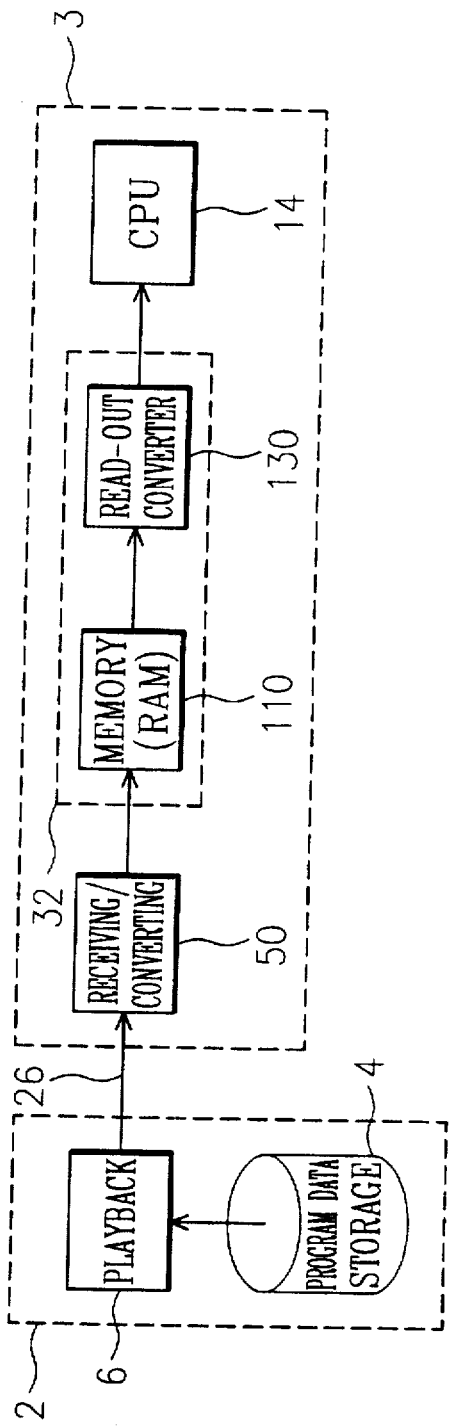
FIG. 18 is a block diagram of another embodiment of the system configuration of the software protection apparatus of the invention, without the write-in converter employed in FIG. 17.

At the other end of the system, a receiver/converter 50, a memory device 32, and a CPU 14 generally make up the software program user end 3. The memory device 32 comprises a write data converter 120, memory 110, and a read data converter 130. After receiving the software program transmitted over the channel 26, the receiver/converter 50 conveys the received program data to the memory device 32, wherein the write data converter 120 and the read-out converter 130 decrypt the received software program data before it is written into the memory 110 for storage. Using the read data converter 130, the data for the software program received at the user end 3 may then be provided to the CPU 14 for execution of the program. Whenever an attempt at program dumping through the use of a microprocessor emulator at the user end 3 is detected by the emulator detector (not detailed in this FIG. 17), the mode control select signal SEL as described above may be set to initiate interference with the illegal dumping attempt. The immediate result of the software data dump interference procedure as provided by the software program protection apparatus of the invention is the output of incorrect data by the emulator, rendering the stolen data useless. A second embodiment of the protection system is shown in FIG. 18 and has an architecture similar to that shown in FIG. 17, but does not use write data converter 120 at the user end 3. It will be appreciated, however, that protection against unauthorized code dumping is provided.

While the invention has been described by way of example and in terms of alternative embodiments, it is to be understood that the invention is not limited to the disclosed embodiments. On the contrary, the invention is intended to cover various modifications and similar arrangements included within the spirit and scope of the appended claims. For example, the signal generator employed in the emulator detector may well be replaced by a random number generator, or the trap address detector may be designed to detect a continuous block of addresses or a number of discrete address locations. The scope of the claims should therefore be accorded the broadest interpretation so as to encompass all such modifications and similar structures.

What is claimed is:

1. An apparatus for protecting a software program from unauthorized access, comprising:

a read-write memory device providing output data that is inconsistent with corresponding input data, for storing the software program, the memory device being coupled to a system bus, the system bus including an address bus, a data bus, and a control bus; and an emulator detector means for detecting the presence of an emulator coupled to any of the buses included in the system bus and for providing a select signal to the read-write memory when an emulator is detected;

the read-write memory device including means for receiving the select signal and means for providing erroneous data to the system bus in response to the select signal.

2. The apparatus of claim 1, wherein the read-write memory device comprises:

a random access memory, connected to the address bus and having a data interface, for storing the software program;

write conversion means, connected to the data bus and the data interface, for converting data written to the random access memory;

read conversion means, connected to the data bus and the data interface, for converting data read from the random access memory; and wherein the random access memory includes control logic, responsive to the select signal received by the select signal receiving means, for controlling the write conversion means and the read conversion means.

3. The apparatus of claim 2, wherein the select signal has an active state and a non-active state and wherein the control logic includes means for controlling the read conversion means to pass correct data to the data bus when the select signal is not active and for passing erroneous data to the data bus when the select signal is active.

4. The apparatus of claim 2, wherein said write conversion means and said read conversion means further include output control means for setting a direction for data flow between the random access memory means and the data bus.

5. The apparatus of claim 4, wherein said output control means is a tri-state buffer.

6. The apparatus of claim 4, wherein said write conversion means is a write path and said read conversion means is a read path.

7. The apparatus of claim 1, wherein the read-write memory means comprises:
- a random access memory connected to the address bus and having a data interface, for storing the software program;
- read conversion means, connected to the data bus and the data interface, for converting data read from the random access memory; and
- control logic, responsive to the select signal received by the select signal receiving means, for controlling the read conversion means.

8. The apparatus of claim 7, wherein the select signal has an active state and a non-active state and wherein the control logic includes means for controlling the read conversion means to pass correct data to the data bus when the select signal is not active and for passing erroneous data to the data bus when the select signal is active.

9. The apparatus of claim 7, wherein said read conversion means further includes output control means for setting a direction for data flow between the random access memory and the data bus.

10. The apparatus of claim 9, wherein said output control means is a tri-state buffer.

11. The apparatus of claim 9, wherein said read conversion means is a read path.

12. The apparatus of claim 1, wherein said emulator detector means comprises:
- monitoring means for monitoring the address bus to detect a suspect address; and
- means, responsive to said monitoring means, for providing the select signal when said monitoring means detects the suspect address.

13. The apparatus of claim 1, wherein said emulator detector means comprises:
- monitoring means for monitoring the address bus to detect a suspect address;
- means, responsive to said monitoring means, for providing an enable signal when said monitoring means detects the suspect address; and
- signal generating means for generating the select signal in response to said enable signal;
- wherein the select signal is an intermittent signal.

14. The apparatus of claim 12, wherein said suspect address corresponds to data in the software program indicating an abnormal condition.

15. The apparatus of claim 13, wherein said suspect address corresponds to data in the software program indicating an abnormal condition.

16. The apparatus of claim 12, wherein the suspect address corresponds to software program data stored in the read-write memory device that is not used during execution of the software program.

17. The apparatus of claim 13, wherein said suspect address corresponds to software program data stored in the read-write memory device that is not used during execution of the software program.

18. The apparatus of claim 12, wherein the suspect address is a continuous block of memory address locations.

19. The apparatus of claim 13, wherein the suspect address is a continuous block of memory address locations.

20. The apparatus of claim 12, wherein the enable signal providing means continues to provide the select signal when said monitoring means detects the suspect address.

21. The apparatus of claim 13, wherein the enable signal providing means continues to provide the enable signal when said monitoring means detects the suspect address.

22. The apparatus of claim 12, wherein the enable signal providing means continues to provide the select signal after said monitoring means detects the suspect address and wherein the emulator detector means further comprises reset means for causing the enable signal providing means to stop providing the select signal.

23. The apparatus of claim 13, wherein the enable signal providing means continues to provide the enable signal after said monitoring means detects the suspect address and wherein the emulator detector means further comprises reset means for causing the enable signal providing means to stop providing the enable signal.

24. The apparatus of claim 2, wherein the control logic is coupled to a read-write control line and a chip select line and controls the write conversion means and read conversion means in response to signals on the read-write control line and the chip select line.

25. The apparatus of claim 7, wherein the control logic is coupled to a read-write control line and a chip select line and controls the read conversion means in response to signals on the read-write line and the chip select line.

26. An apparatus for protecting a software program from unauthorized access, comprising:
- a read-write memory device having output data that is inconsistent with corresponding input data, for storing said software program, the memory device being coupled to a system bus including an address bus, a data bus, and a control bus; and
- an emulator detector means for detecting the presence of an emulator coupled to the system bus and for interfering with the system bus when an emulator is detected.

27. The apparatus of claim 26, wherein the read-write memory means comprises:
- a random access memory connected to the address bus and having a data interface, for storing the software program;
- write conversion means connected to the data bus and the data interface for converting data written to the random access memory;
- read conversion means connected to the data bus and the data interface for converting data read from the random access memory; and
- control logic, responsive to a read-write control signal and a chip select signal, for controlling the write conversion means and the read conversion means.

28. The apparatus of claim 26, wherein the read-write memory device comprises:
- a random access memory connected to the address bus and having a data interface, for storing the software program;
- read conversion means connected to the data bus and the data interface for converting data read from the random access memory; and
- control logic, responsive to a read-write control signal and a chip select signal, for controlling the write conversion means and the read conversion means.

29. The apparatus of claim 27, wherein said write conversion means and said read conversion means further include output control means for setting a direction for data flow between the random access memory and the data bus.

30. The apparatus of claim 28, wherein said read conversion means further include output control means for setting a direction for data flow between the random access memory means and the data bus.

31. The apparatus of claim 29, wherein said output control means is a tri-state buffer.

32. The apparatus of claim 30, wherein said output control means is a tri-state buffer.

33. The apparatus of claim 27, wherein said write conversion means is a write path and said read conversion means is a read path.

34. The apparatus of claim 28, wherein said read conversion means is a read path.

35. The apparatus of claim 26, wherein said emulator detector means comprises:

monitoring means for monitoring the address bus to detect a suspect address;

means, responsive to said monitoring means, for providing an enable signal when said monitoring means detects the suspect address;

signal generating means for generating a drive signal in response to the enable signal; and driving means for driving the data bus to a particular electrical potential in response to the drive signal.

36. The apparatus of claim 35, wherein said suspect address corresponds to data in the software program indicating an abnormal condition.

37. The apparatus of claim 35, wherein said suspect address corresponds to software program data stored in the read-write memory device that is not used during execution of the software program.

38. The apparatus of claim 35, wherein the suspect address is a continuous block of memory address locations.

39. The apparatus of claim 35, wherein the select signal providing means continues to provide the select signal after said monitoring means detects the suspect address.

40. The apparatus of claim 35, wherein the select signal providing means continues to provide the select signal after said monitoring means detects the suspect address and wherein the emulator detector means further comprises reset means for causing the select signal providing means to stop providing the select signal.

41. The apparatus of claim 35, wherein said particular electrical potential is a ground potential.

42. The apparatus of claim 35, wherein said particular electrical potential is a power supply potential.

43. The apparatus of claim 35, wherein said drive signal is a continuous signal.

44. A method for protecting a software program against unauthorized copying, comprising the steps of:

(a) monitoring addressing of a memory containing the software program, the memory providing output data that is inconsistent with corresponding input data;

(b) detecting an attempted access of a suspect address; and (c) driving data provided by the memory to a predetermined electrical potential if a suspect address is detected.

45. The method of claim 44, wherein said step (c) comprises:

(d) generating an intermittent drive signal if a suspect address is detected; and (e) driving data provided by the memory to an electrical potential in response to the intermittent drive signal.

46. The method of claim 44, wherein said step (c) comprises:

(d) generating a continuous drive signal if a suspect address is detected; and (e) driving data provided by the memory to an electrical potential in response to the continuous drive signal.

47. The method of claim 45, further comprising the initial steps of reading program data, storing the program data in the memory, and executing the program data as a system initiating program.

48. The method of claim 46, further comprising the initial steps of reading program data, storing the program data in the memory, and executing the program data as a system initiating program.

49. The method of claim 47, wherein the program data is read from a communication device which provides the program data for downloading through a communication medium.

50. The method of claim 48, wherein the program data is read from a communication device which provides the program data for downloading through a communication medium.

51. The method of claim 47, wherein the program data is read from a communication device which provides the program data for downloading through a cable television network.

52. The method of claim 48, wherein the program data is read from a communication device which provides the program data for downloading through a cable television network.

53. The method of claim 47, wherein the program data is read from a communication device which provides the program data for downloading by satellite communication.

54. The method of claim 48, wherein the program data is read from a communication device which provides the program data for downloading by satellite communication.

55. The method of claim 47, wherein the program data is read from a communication device which provides the program data for downloading through a telephone network.

56. The method of claim 48, wherein the program data is read from a communication device which provides the program data for downloading through a telephone network.

57. The method of claim 45, wherein said step (b) comprises the step of detecting memory access operations caused by activities not occurring during execution of the software program.

58. The method of claim 46, wherein said step (b) comprises the step of detecting memory access operations caused by activities not occurring during execution of the software program.

59. The method of claim 45, wherein said step (b) comprises the step of detecting an attempted access of an address that does not correspond with software program data in the memory.

60. The method of claim 46, wherein said step (b) comprises the step of detecting an attempted access of an address that does not correspond with software program data in the memory.

61. The method of claim 45, wherein said step (b) comprises the step of detecting an attempted access of a continuous block of addresses that does not correspond with software program data in the memory.

62. The method of claim 46, wherein said step (b) comprises the step of detecting an attempted access of a continuous block of addresses that does not correspond with software program data in the memory.

63. The method of claim 45, wherein said step (d) comprises enabling a signal generator to generate the drive signal by asserting a latch output when the attempted access of a suspect address is detected.

64. The method of claim 46, wherein said step (d') comprises enabling a signal generator to generate the drive signal by asserting a latch output when the attempted access of a suspect address is detected.

65. The method of claim 45, further comprising the step of generating a reset signal at a system reset to stop the generation of said drive signal.

66. The method of claim 46, further comprising the step of generating a reset signal at a system reset to stop the generation of said drive signal.

67. The method of claim 45, wherein said predetermined electrical potential is a ground potential.

68. The method of claim 46, wherein said predetermined electrical potential is a ground potential.

69. The method of claim 45, wherein said predetermined electrical potential is a power supply potential.

70. The method of claim 46, wherein said predetermined electrical potential is a power supply potential.

71. A method for protecting a software program against unauthorized copying, comprising the steps of:
(a) monitoring addressing of a memory containing the software program, the memory providing output data that is inconsistent with corresponding input data;
(b) detecting the attempted access of a suspect address;
(c) generating a select signal when a suspect address is detected; and
(d) switching the memory from a normal mode to an erroneous data mode in response to the select signal, the memory providing correct data when in the normal mode and providing erroneous data when in the erroneous mode.

72. The method of claim 71, wherein said step (c) further comprises generating an enable signal when a suspect address is detected and initiating generation of an intermittent select signal in response to the enable signal for switching the memory between the normal mode and the erroneous mode.

73. The method of claim 71, further comprising the initial steps of reading program data, storing the program data in the memory, and executing the program data as a system initiating program.

74. The method of claim 72, further comprising the initial steps of reading program data, storing the program data in the memory, and executing the program data as a system initiating program.

75. The method of claim 73, wherein the program data is read from a communication device which provides the program data for downloading through a communication medium.

76. The method of claim 74, wherein the program data is read from a communication device which provides the program data for downloading through a communication medium.

77. The method of claim 73, wherein the program data is read from a communication device which provides the program data for downloading through a cable television network.

78. The method of claim 74, wherein the program data is read from a communication device which provides the program data for downloading through a cable television network.

79. The method of claim 73, wherein the program data is read from a communication device which provides the program data for downloading by satellite communication.

80. The method of claim 74, wherein the program data is read from a communication device which provides the program data for downloading by satellite communication.

81. The method of claim 73, wherein the program data is read from a communication device which provides the program data for downloading through a telephone network.

82. The method of claim 74, wherein the program data is read from a communication device which provides the program data for downloading through a telephone network.

83. The method of claim 71, wherein said step (b) comprises the step of detecting memory access operations caused by activities not occurring during execution of the software program.

84. The method of claim 72, wherein said step (b) comprises the step of detecting memory access operations caused by activities not occurring during execution of the software program.

85. The method of claim 71, wherein said step (b) comprises the step of detecting an attempted access of an address that does not correspond with software program data in the memory.

86. The method of claim 72, wherein said step (b) comprises the step of detecting an attempted access of an address that does not correspond with software program data in the memory.

87. The method of claim 71, wherein said step (b) comprises the step of detecting an attempted access of a continuous block of addresses that does not correspond with software program data in the memory.

88. The method of claim 72, wherein said step (b) comprises the step of detecting an attempted access of a continuous block of addresses that does not correspond with software program data in the memory.

89. The method of claim 71, wherein the step of generating an intermittent select signal comprises the step of asserting a latch output when the attempted access of a suspect address is detected.

90. The method of claim 72, wherein the step of generating an enable signal comprises the step of asserting a latch output when the attempted access of a suspect address is detected.

91. The method of claim 71, further comprising the step of generating a reset signal on a system reset to stop the generation of said intermittent select signal.

92. The method of claim 72, further comprising the step of generating a reset signal on a system reset to stop the generation of the intermittent select signal.

93. A method for protecting software against copying, comprising the steps of:
(a) reading program data and storing said program data in a memory providing output data that is inconsistent with corresponding input data, the memory being connected to a system bus, the system bus including an address bus, a data bus, and a control bus;
(b) monitoring the system bus;
(c) detecting the attempted access of a suspect memory address;
(d) generating an intermittent drive signal when a suspect address is detected; and
(e) driving data read from the memory to a predetermined electrical potential in response to the intermittent signal, this rendering at least some of said data erroneous.

94. The method of claim 93, wherein the program data is stored in the memory and executing the program data as a system initiating program.

95. The method of claim 93, wherein the program data is read from a communication device which provides the program data for downloading through a communication medium.

96. The method of claim 93, wherein the program data is read from a communication device which provides the program data for downloading through a cable television network.

97. The method of claim 93, wherein the program data is read from a communication device which provides the program data for downloading by satellite communication.

98. The method of claim 93, wherein the program data is read from a communication device which provides the program data for downloading through a telephone network.

99. The method of claim 93, wherein said step (c) comprises the step of detecting memory access operations caused by activities not occurring during execution of the software program.

100. The method of claim 93, wherein said step (c) comprises the step of detecting an attempted access of an address that does not correspond with software program data in the memory.

101. The method of claim 93, wherein said step (c) comprises the step of detecting an attempted access of a continuous block of addresses that does not correspond with software program data in the memory.

102. The method of claim 93, wherein the step of generating an intermittent drive signal comprises the step of enabling a signal generator to generate the drive signal by asserting a latch output when the attempted access of a suspect address is detected.

103. The method of claim 93, further comprising the step of generating a reset signal on a system reset to stop the generation of said intermittent drive signal.

104. The method of claim 93, wherein said predetermined electrical potential is a ground potential.

105. The method of claim 93, wherein said predetermined electrical potential is a power supply potential.

106. A method for protecting software against copying, comprising the steps of:
(a) storing program data in memory providing output data that is inconsistent with corresponding input data, the memory having at least one detection address not accessed during execution of the software, the memory being connected to a system bus, the system bus including an address bus, a data bus, and a control bus;
(b) monitoring the system bus;
(c) detecting the attempted access of a suspect address;
(d) generating an intermittent drive signal when a suspect address is detected; and
(e) driving data read from the memory to a predetermined electrical potential in response to the intermittent signal.

107. The method of claim 106, wherein the program data is stored in the memory as a system initiating program.

108. The method of claim 106, wherein the program data is read from a communication device which provides the program data for downloading through a communication medium.

109. The method of claim 106, wherein the program data is read from a communication device which provides the program data for downloading through a cable television network.

110. The method of claim 106, wherein the program data is read from a communication device which provides the program data for downloading by satellite communication.

111. The method of claim 106, wherein the program data is read from a communication device which provides the program data for downloading through a telephone network.

112. The method of claim 106, wherein said step (c) comprises the step of detecting memory access operations caused by activities not occurring during execution of the software program.

113. The method of claim 106, wherein said step (c) comprises the step of detecting an attempted access of an address that does not correspond with software program data in the memory.

114. The method of claim 106, wherein said step (c) comprises the step of detecting an attempted access of a continuous block of addresses that does not correspond with software program data in the memory.

115. The method of claim 106, wherein the step of generating an intermittent drive signal comprises the step of enabling a signal generator to generate the drive signal by asserting a latch output when the attempted access of a suspect address is detected.

116. The method of claim 106, further comprising the step of generating a reset signal on a system reset to stop the generation of said intermittent drive signal.

117. The method of claim 106, wherein said predetermined electrical potential is a ground potential.

118. The method of claim 106, wherein said predetermined electrical potential is a power supply potential.

119. A method of software protection utilizing a read-write memory device having inconsistent input and output data, said method is suitable for protection of software programs transmitted unidirectionally from a software distribution end to a user end against illegal pirating via illegal reading, said method comprising the steps of:
(a) providing an encryption procedure for encrypting a software program at said distribution end;
(b) providing a transmission procedure for distributing said encrypted software program from said distribution end to said user end via a communication media;
(c) providing a receiving procedure for receiving said encrypted software program at said user end;
(d) providing a decryption procedure for decrypting said received software program and writing said decrypted software program into a read-write memory device having inconsistent input and output data;
(e) providing an emulator detection procedure for detecting the presence of said microprocessor emulator that is attempting to access said software program stored in said read-write memory device having inconsistent input and output data;
(f) providing an erroneous data reading mode for rendering the data accessed by said microprocessor emulator erroneous when said detection procedure determines there has been the emulator attempting to access said software program data;
thus rendering at least some of the data accessed by said microprocessor emulator erroneous thereby achieving protection of said software program.

120. The method of claim 119, wherein said step (a) includes applying hardware encryption techniques to the software program.

121. The method of claim 119, wherein said step (a) includes applying software encryption techniques to the software program.

122. The method of claim 119, wherein said step (a) includes applying a data write conversion process and a data read conversion process to the software program.

123. The method of claim 119, wherein said step (a) includes applying a data read conversion process to the software program.

124. The method of claim 119, wherein said step (d) comprises writing the software program in a memory and said step (e) comprises the step of detecting memory access operations caused by activities not occurring during execution of the software program.

125. The method of claim 119, wherein said step (d) comprises writing the software program in a memory and said step (e) comprises the step of detecting an attempted access of an address that does not correspond with software program data in the memory.

126. The method of claim 119, wherein said step (d) comprises writing the software program in a memory and said step (e) comprises the step of detecting an attempted access of a continuous block of addresses that does not correspond with software program data in the memory.

127. The method of claim 119, wherein said step (f) comprises converting program data to erroneous data during a read operation performed on the memory.

128. The method of claim 119, wherein said step (f) comprises interfering with a system bus to render accessed data erroneous.

* * * * *